US008576757B2

(12) United States Patent
Makhija et al.

(10) Patent No.: US 8,576,757 B2
(45) Date of Patent: Nov. 5, 2013

(54) DYNAMIC ADJUSTMENT OF SETUP TIME BASED ON PAGING PERFORMANCE

(75) Inventors: Rohit Haresh Makhija, San Diego, CA (US); Anil S. Rao, San Diego, CA (US); Maheedhar Gollamudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1332 days.

(21) Appl. No.: 11/955,338

(22) Filed: Dec. 12, 2007

(65) Prior Publication Data

US 2009/0154385 A1   Jun. 18, 2009

(51) Int. Cl.
*H04Q 7/20* (2006.01)
(52) U.S. Cl.
USPC .......................................................... 370/311
(58) Field of Classification Search
USPC .......................................................... 370/311
See application file for complete search history.

(56) References Cited

U.S. PATENT DOCUMENTS

| | | | |
|---|---|---|---|
| 7,047,050 B1 | 5/2006 | Khawand et al. | |
| 7,463,599 B2 | 12/2008 | Lindoff et al. | |
| 8,041,972 B2 | 10/2011 | Jarosinski et al. | |
| 2002/0097099 A1 | 7/2002 | Miyamoto | |
| 2003/0003942 A1 | 1/2003 | Okumura | |
| 2004/0185820 A1* | 9/2004 | Ogura | 455/343.1 |
| 2007/0206524 A1* | 9/2007 | Suk | 370/320 |

FOREIGN PATENT DOCUMENTS

| | | |
|---|---|---|
| EP | 1499144 A1 | 1/2005 |
| JP | H10145467 A | 5/1998 |
| JP | H10178384 A | 6/1998 |
| JP | 2002217712 A | 8/2002 |
| JP | 2003018090 A | 1/2003 |
| JP | 2005526460 A | 9/2005 |
| JP | 2009532999 A | 9/2009 |
| WO | 03098954 A1 | 11/2003 |
| WO | WO2005072001 | 8/2005 |
| WO | 07115319 | 10/2007 |

OTHER PUBLICATIONS

International Search Report and Written Opinion—PCT/US2008/086677, International Search Authority—European Patent Office—Jul. 5, 2009.
European Search Report—EP08153839—Search Authority—Munich—Arp. 27, 2009.
Taiwan Search Report—TW097148688—TIPO—Jan. 16, 2012.

* cited by examiner

*Primary Examiner* — Sulaiman Nooristany
(74) *Attorney, Agent, or Firm* — Kevin T. Cheatham

(57) ABSTRACT

Techniques for dynamically determining a target setup time based on paging performance are described. A UE in an idle mode may be assigned paging occasions, which are specific time intervals in which the UE might receive paging messages. The UE may wake up a setup time prior to each paging occasion, perform setup tasks, detect for a paging indicator, and possibly receive a paging message. The UE may dynamically determine a target setup time for each awake interval based on paging performance. The target setup time may be (i) decreased by a down step if the paging performance is better than a first threshold or (ii) increased by an up step if the paging performance is worse than a second threshold. The target setup time may be updated in each fixed update period or whenever the paging performance is outside the first and second thresholds.

25 Claims, 9 Drawing Sheets

DYNAMIC ADJUSTMENT OF SETUP TIME BASED ON PAGING PERFORMANCE

BACKGROUND

I. Field

The present disclosure relates generally to communication, and more specifically to techniques for operating a user equipment (UE) in a wireless communication system.

II. Background

A UE (e.g., a cellular phone) in a wireless communication system may operate in one of several modes, such as active and idle modes, at any given moment. In the active mode, the UE may actively exchange data with one or more base stations in the system, e.g., for a voice and/or data call. In the idle mode, the UE may monitor a paging channel for paging messages applicable for the UE. Such messages may include messages that alert the UE to the presence of an incoming call and messages that carry system and other information for the UE.

In the idle mode, the UE continues to consume power in order to sustain circuitry used to process the paging channel. The UE may be portable and powered by an internal battery. Power consumption by the UE in the idle mode decreases the available battery power, which then shortens the standby time between battery recharges and the talk time when a call is placed or received. Therefore, it is highly desirable to minimize power consumption in the idle mode in order to extend battery life.

SUMMARY

Techniques for dynamically determining a target setup time for each awake interval based on paging performance are described herein. A UE in the idle mode may be assigned paging occasions, which are specific time intervals in which the UE might receive paging messages. The UE may wake up a setup time prior to each paging occasion, perform setup/warm-up tasks, detect for a paging indicator, and possibly receive a paging message. The UE may determine a wake-up time for the next awake interval based on a target setup time, which may be determined such that the UE has sufficient time to perform the setup tasks and become ready to detect the paging indicator.

The UE may dynamically determine the target setup time for each awake interval based on paging performance, which may be given by a decoding error rate of paging indicators for the UE. The target setup time may be (i) decreased by a down step if the paging performance is better than a first threshold, e.g., if the decoding error rate is less than Th1, or (ii) increased by an up step if the paging performance is worse than a second threshold, e.g., if the decoding error rate is higher than Th2. Th1 and Th2 may be selected based on the desired paging performance. In one design, the target setup time may be updated in each update period of a predetermined number of awake intervals. In another design, the paging performance may be determined for a period of at least N awake intervals after a prior adjustment of the target setup time, where N is greater than one. The target setup time may then be adjusted if the paging performance is better than the first threshold or worse than the second threshold. The target setup time may be increased within an initial period of N awake intervals after the prior adjustment only if the paging performance is worse than a third threshold, e.g., if the decoding error rate is higher than Th3, where Th3 may be higher than Th2. The adjustment of the target setup time is described in greater detail below.

The techniques described herein may also be used to receive other transmissions sent at known time intervals. Various aspects and features of the disclosure are described in further detail below.

DETAILED DESCRIPTION

Figure 1:
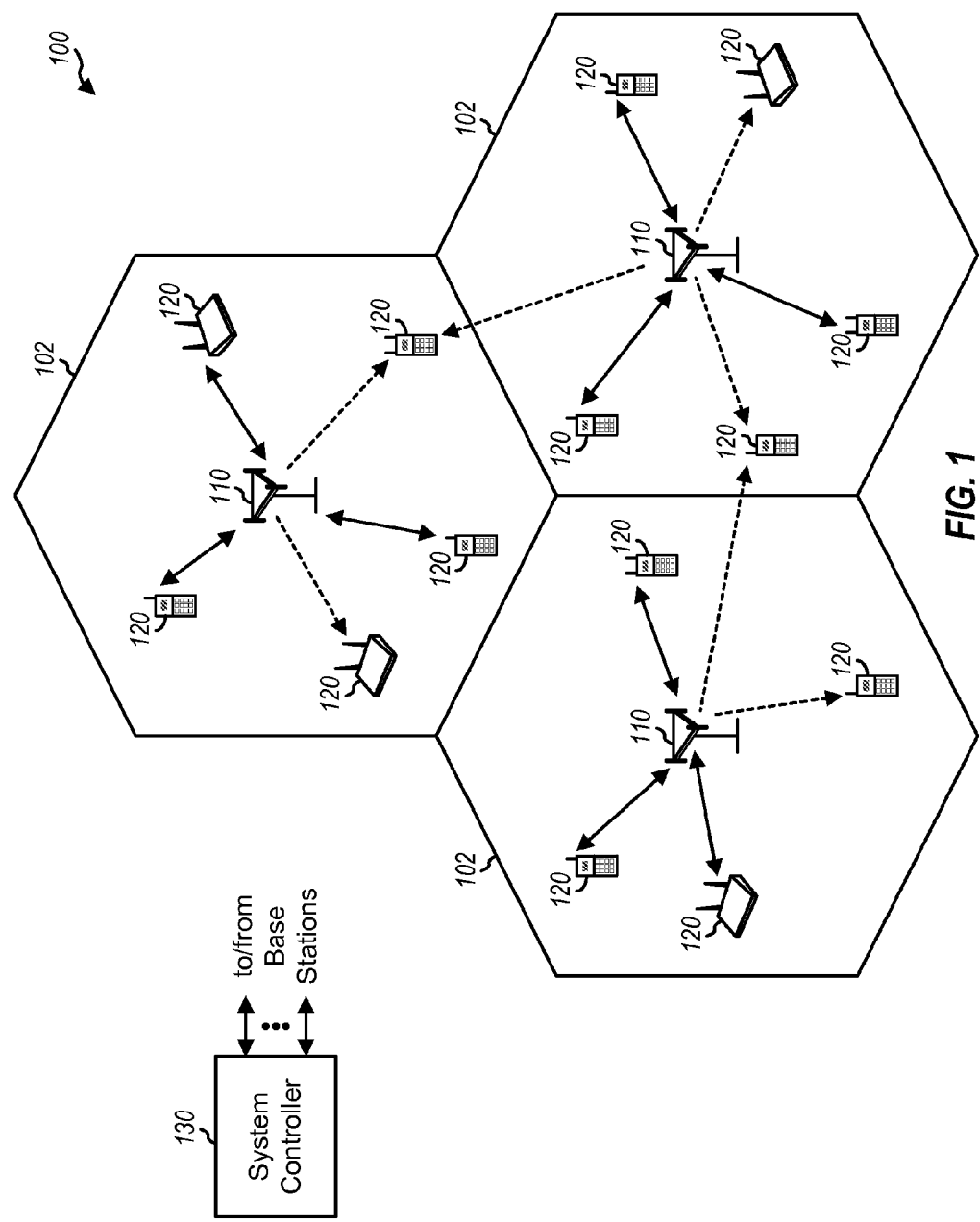
FIG. 1 shows a wireless communication system.

FIG. 1 shows a wireless communication system 100 with multiple Node Bs 110. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. A system controller 130 may couple to Node Bs 110 and provide coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, etc. A UE may communicate with one or more Node Bs via the downlink and uplink. The downlink (or forward link) refers to the communication link from the Node Bs to the UEs, and the uplink (or reverse link) refers to the communication link from the UEs to the Node Bs. In FIG. 1, a solid line with double arrows indicates data exchanges between a Node B and a UE in the active mode. A broken line with a single arrow indicates a UE in the idle mode receiving paging messages and/or other information. A UE may be served by a specific Node B, which is referred to as a serving cell for the UE.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, etc. The terms "system" and "network" are often used interchangeably. A CDMA system may implement a radio technology such as Universal Terrestrial Radio Access (UTRA), cdma2000, etc. UTRA includes Wideband CDMA (W-CDMA) and other variants of CDMA. cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.16, IEEE 802.20, Flash-OFDM®, etc. These various radio technologies and standards are known in the art. GSM, UTRA, and E-UTRA are described in documents from an organization named "3rd Generation Partnership Project" (3GPP). cdma2000 and UMB are described in documents from an organization named "3rd Generation Partnership Project 2" (3GPP2). 3GPP and 3GPP2 documents are publicly available.

The techniques described herein may be used to receive various types of transmission that are sent at known time intervals. These transmissions may or may not be periodic. For example, the techniques may be used to receive paging information, traffic data, broadcast data, etc. For clarity, the techniques are described below for receiving paging information in Universal Mobile Telecommunication System (UMTS), which utilizes W-CDMA.

In UMTS, a Page Indicator Channel (PICH) is used to send paging indicators to idle UEs, and a Paging Channel (PCH) is used to send paging messages to the idle UEs. A UE may register with the system and may operate in the idle mode when the UE is not actively exchanging data with any Node B. In the idle mode, the UE may monitor its paging indicators to determine whether paging messages might be sent on the PCH to the UE. If a paging indicator for the UE is set, then the UE may process the PCH to look for any paging message sent to the UE. The UE can detect the PICH more quickly and typically processes the PCH only if the PICH indicates that a paging message might be sent to the UE.

Figure 2:
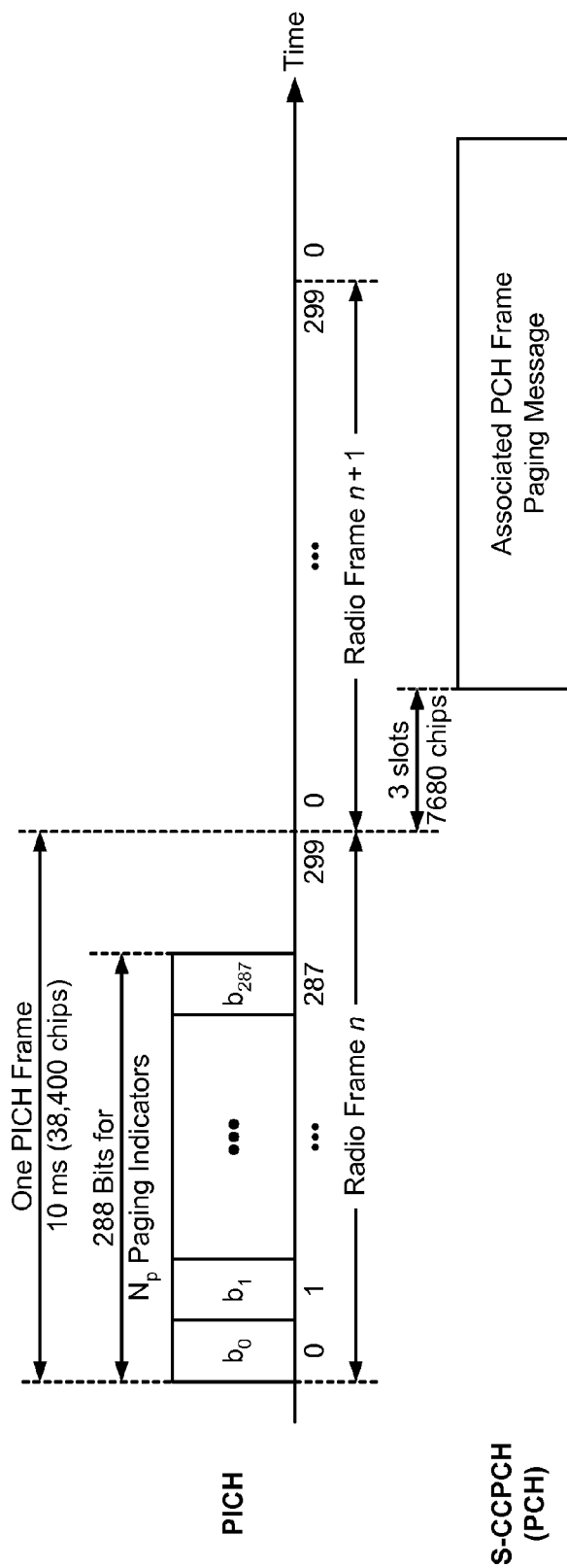
FIG. 2 shows a Paging Indicator Channel (PICH) and a Paging Channel (PCH).

FIG. 2 shows the format of the PICH and PCH in UMTS. The transmission timeline is partitioned into radio frames. Each radio frame has a duration of 10 millisecond (ms) and is identified by a 12-bit system frame number (SFN). Each radio frame includes 15 slots, and each slot covers 2560 chips.

For the PICH, each PICH frame includes 300 bits with indices of 0 through 299. The first 288 bits $b_0$ through $b_{287}$ are used for $N_p$ paging indicators, and the last 12 bits are reserved for other uses and are not shown in FIG. 2. $N_p$ is configurable and may be equal to 18, 36, 72 or 144. Each paging indicator is sent in $288/N_p$ consecutive bits in the PICH frame, where $288/N_p$ may be equal to 16, 8, 4 or 2. The $288/N_p$ bits are all set to '1' if the paging indicator is equal to '1' and are set to '0' if the paging indicator is equal to '0'. Each PICH frame is associated with a PCH frame that is delayed by 3 slots. For each PICH frame, paging messages for UEs whose paging indicators are set in that PICH frame are sent in the associated PCH frame. The PCH may be sent in a Secondary Common Control Physical Channel (S-CCPCH).

Other systems such as cdma2000 systems use similar concept of sending paging indicators on one channel and paging messages on another channel. However, the channels may be referred to by other names, and the paging indicators and paging messages may be sent in other manners.

Figure 3:
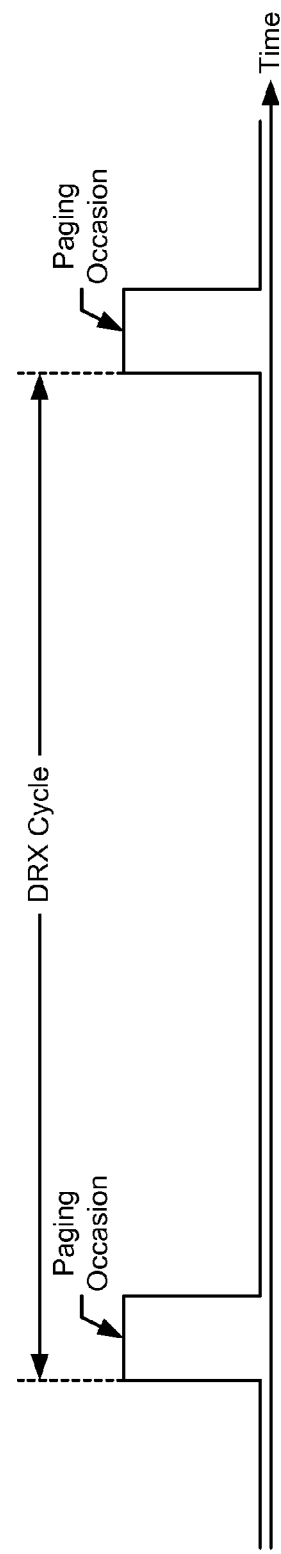
FIG. 3 shows a timeline for a UE in the idle mode.

FIG. 3 shows a timeline for an idle UE operating in a discontinuous reception (DRX) mode. The DRX mode may also be referred to as slotted mode paging. In the DRX mode, the UE is assigned paging occasions, which are specific PICH frames in which paging indicators for the UE are sent. The paging occasions for the UE may be separated by a time interval referred to as a DRX cycle. The DRX cycle may be configurable for the UE and may range from 80 ms to 5.12 seconds. The paging occasions for the UE may be determined based on parameters such as a unique identifier for the UE. The DRX cycle and paging occasions in UMTS may correspond to slot cycles and slots, respectively, in some other systems that support slotted mode paging.

The UE is assigned a specific paging indicator in each paging occasion. This paging indicator is determined based on a known function. Other UEs may also be assigned the same paging indicator, and the paging indicator is set if a paging message is being sent to any of the UEs assigned with this paging indicator. Thus, the UE would known that no paging message is being sent to the UE if the paging indicator is not set but would not know whether a paging message is being sent to the UE or another UE if the paging indicator is set.

The UE may wake up prior to each paging occasion to process the PICH and possibly receive any paging message sent on the PCH to the UE. The UE may go to sleep during the time between its paging occasions if there are no other tasks to perform. Sleep may be a low-power state in which some circuitry within the UE may be powered down. The UE may power down as much circuitry as possible while asleep in order to conserve battery power.

Figure 4:
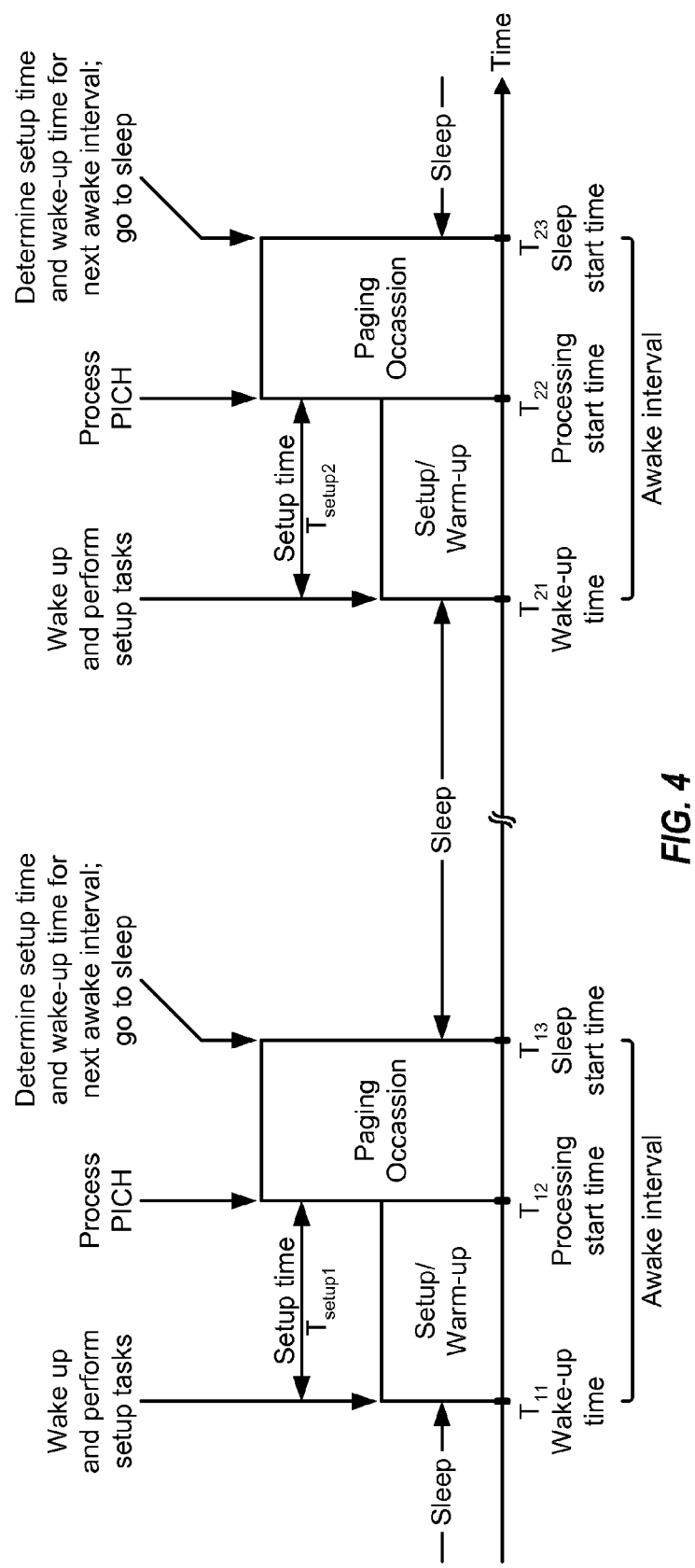
FIG. 4 shows a timeline for processing the PICH by the UE.

FIG. 4 shows a timeline for processing the PICH by the UE. At time $T_{11}$, the UE may wake up and perform setup/warm-up tasks for the current paging occasion. At time $T_{12}$, the UE may process the PICH to detect its paging indicator. The difference between times $T_{11}$ and $T_{12}$ may be referred to as setup time, warm-up time, ready time, etc. The UE may process the PCH if its paging indicator is set. After processing the PICH/PCH, the UE may determine the setup time for the next paging occasion and may then determine the amount of time to sleep. The UE may then go to sleep at time $T_{13}$ for the determined amount of time. The calculation of the next wake-up time and the powering down of circuitry within the UE may occur during a cool-down period, which is not shown in FIG. 4 for simplicity.

The UE may wake up at time $T_{21}$ prior to the start of the next paging occasion. The UE may perform setup tasks, process the PICH starting at time $T_{22}$, and process the PCH if applicable. The UE may then determine the setup time for the following paging occasion, determine the amount of time to sleep, and go to sleep at time $T_{23}$ for the determined amount of time.

The UE may power down as much circuitry as possible during sleep in order to conserve battery power. The UE may power up pertinent circuit blocks upon waking up from sleep and may perform various setup tasks prior to processing the PICH and PCH. For example, the setup tasks may include powering up oscillators and digital circuits, rebooting software, downloading program code, turning on the receiver, acquiring pilots, assigning hardware to process a selected Node B, acquire timing and frequency of the selected Node B, etc.

It is desirable to reduce the setup time for each paging occasion in order to extend sleep time and improve power saving. The setup time may be determined empirically during a design phase and may be programmed into the UE. The programmed setup time may be a conservative value in order to ensure good paging performance under various conditions. The setup time may be dependent on various factors such as network conditions, software and hardware configurations of the UE, software activity/tasks at the UE, changes in hardware components, etc. The programmed setup time may then be selected such that the UE can be ready prior to each paging occasion even in the worst-case scenario. However, the conservative value for the programmed setup time may result in the UE waking up too early in many instances since the UE may seldom observe the worst-case scenario.

In an aspect, the setup time may be dynamically determined based on paging performance. This may ensure that the setup time will be sufficiently long to achieve the desired paging performance but as short as possible to improve power saving. The setup time may be dynamically determined in various manners.

Figure 5:
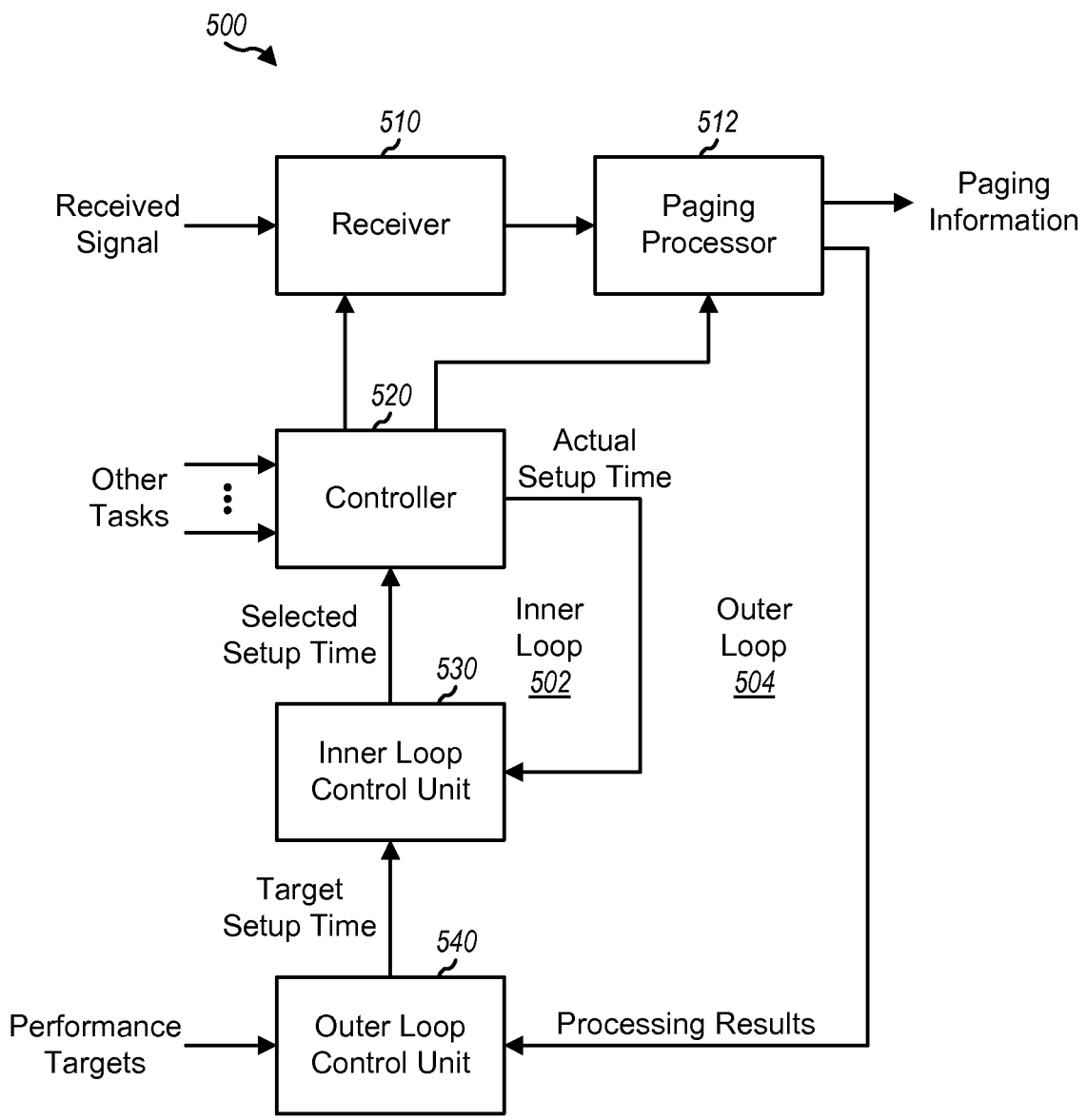
FIG. 5 shows a mechanism for determining setup time with inner and outer loops.

FIG. 5 shows a design of a mechanism 500 for dynamically determining setup time. In this design, mechanism 500 includes an inner loop 502 that determines a selected setup time for each paging occasion and an outer loop 504 that determines a target setup time for each paging occasion.

A controller 520 may direct the operation of various units within the UE and may provide control signals to power up a receiver 510 and a paging processor 512 for each paging occasion. When powered up, receiver 510 may process a received signal and provide samples. When powered up, paging processor 512 may process the samples from receiver 510 to detect for a paging indicator assigned to the UE. Paging processor 512 may also demodulate and decode the PCH to recover any paging message for the UE.

For inner loop 502, a control unit 530 may receive a target setup time from a control unit 540 and an actual setup time for the current paging occasion from controller 520. Control unit 530 may determine a selected setup time for the next paging occasion based on the actual setup time for the current paging occasion and the target setup time. Controller 520 may determine the wake-up time for each paging occasion such that the selected setup time can be achieved. However, the actual wake-up time may vary from the intended wake-up time due to various factors such as operating system interrupt/task latency variation, sleep clock inaccuracies (e.g., due to heat, aging, glitches, etc.), unexpected activity on the UE that may temporarily take over a processor (e.g., key press, camera, Bluetooth, MediaFlo, etc.), different timing between new hardware components and older components, etc. Control unit 530 may determine the selected setup time in a manner to account for error/variation in the actual wake-up time, so that the actual setup time can match the target setup time.

In one design, the selected setup time may be determined as follows:

$$T_{selected-setup}(n+1) = T_{target-setup} + \beta^* \{T_{target-setup} - T_{actual-setup}(n)\}, \quad \text{Eq (1)}$$

where
$T_{actual-setup}(n)$ is the actual setup time for paging occasion n,
$T_{selected-setup}(n+1)$ is the selected setup time for the next paging occasion n+1,
$T_{target-setup}$ is the target setup time, and
$\beta$ is a correction factor.

As an example, if the target setup time is 20 ticks and the actual setup time is 18 ticks, then the selected setup time for the next paging occasion may be between 20 and 22 ticks depending on the value of $\beta$. A tick is a unit of time and may be of any suitable duration, e.g., 0.667 ms. In one design, $\beta$ is a value less than one (e.g., $\beta=0.75$) to avoid over-correction of the setup time. The inner loop may be updated in each paging occasion, as shown in equation (1). The inner loop may also be updated at a slower rate, e.g., every L-th paging occasion where L may be any integer value.

In another design, the selected setup time may be determined as follows:

$$T_{selected-setup}(n+1) = T_{selected-setup}(n) + \beta \{T_{target-setup} - T_{actual-setup}(n)\}. \quad \text{Eq (2)}$$

The design in equation (2) determines the selected setup time for the next paging occasion based on the selected setup time for the current paging occasion. In contrast, the design in equation (1) has no memory of the selected setup time. The selected setup time may also be determined in other manners.

Inner loop 502 may be used to account for error/variation in the actual setup time, which may change from DRX cycle to DRX cycle. Inner loop 502 may be omitted if there are no errors or negligible errors in the actual setup time.

For outer loop 504, control unit 540 may receive processing results from paging processor 512 and may determine paging performance based on the processing results. Control unit 540 may compare the paging performance against performance targets and adjust the target setup time to achieve the desired paging performance.

Paging performance may be quantified by various metrics. In one design, paging performance is quantified by paging errors, where a paging error occurs if a paging indicator for the UE in a paging occasion is not detected. Paging processor 512 may accumulate the energy of all samples for a paging indicator for the UE and may then compare the accumulated energy against high and low thresholds. Paging processor 512 may declare a '1' for the paging indicator if the accumulated energy is above the high threshold and may declare a '0' if the accumulated energy is below the low threshold. A paging error may be declared if the accumulated energy is between the low and high thresholds, which may result from the UE waking up late and accumulating energy for an insufficient number of samples for the paging indicator. This paging error may be referred to as a PI_Sum error. A paging error may also be declared if the UE wakes up too late and misses the paging indicator. This paging error may be referred to as a late paging occasion error or a PO_Late error.

In one design, a decoding error rate may be determined as follows:

$$\text{Decoding error rate} = \frac{\text{Number of PI\_Sum errors} + \text{Number of PO\_Late errors}}{\text{Number of paging occasions}}. \quad \text{Eq (3)}$$

In general, the decoding error rate may be determined based on the number of paging errors and the total number of paging indicators. A paging error may be due to any reason.

The target setup time may be adjusted based on paging performance in various manners. In one design, the target setup time may be adjusted to achieve the desired paging performance as follows:

$$T_{target-setup}(k+1) = \begin{cases} T_{target-setup}(k) - \Delta\text{down} & \text{if Decoding error rate} < Th1 \\ T_{target-setup}(k) + \Delta\text{up} & \text{if Decoding error rate} > Th2 \\ T_{target-setup}(k) & \text{otherwise,} \end{cases} \quad \text{Eq (4)}$$

where
$T_{target-setup}(k)$ is the target setup time for outer loop update interval k,
$\Delta$down is a down step size and $\Delta$up is an up step size, and
Th1 is a lower decoding error rate threshold and Th2 is a higher decoding error rate threshold.

In the design shown in equation (4), the desired paging performance is defined by the lower and higher decoding error rate thresholds, Th1 and Th2, which may be any suitable values. For example, Th1 may be equal to 0.75%, and Th2 may be equal to 1%. Other values may also be used for Th1 and Th2. The target setup time may be decreased by Δdown if the decoding error rate is below Th1 and may be increased by Δup if the decoding error rate is greater than Th2. The Δdown and Δup step sizes determine the rate of convergence of the outer loop and may be any suitable values. In one design, Δdown is equal to Δup, and both may be equal to one tick. In another design, Δup is larger than Δdown, and the target setup time may be increased by a larger up step in order to avoid degradation in paging performance. For example, Δup may be equal to three ticks, and Δdown may be equal to one tick. Other values may also be used for Δdown and Δup.

The target setup time may be constrained to be within a predetermined range as follows:

$$T_{target-setup}(k+1) = \begin{cases} T_{max-setup} & \text{if } T_{target-setup}(k+1) > T_{max-setup} \\ T_{min-setup} & \text{if } T_{target-setup}(k+1) < T_{min-setup} \\ T_{target-setup}(k+1) & \text{otherwise,} \end{cases} \quad \text{Eq (5)}$$

where $T_{max\text{-}setup}$ is the maximum target setup time, and
$T_{min\text{-}setup}$ is the minimum target setup time.

The maximum target setup time may be selected to achieve good paging performance under the expected worst-case conditions. If the desired paging performance cannot be obtained with the maximum target setup time, then it may be assumed that an inexplicable network condition exists and that increasing the target setup time further would not alleviate this condition. The UE may alert the system if the desired paging performance could not be achieved with the maximum target setup time.

The target setup time may be updated in various manners. In a first outer loop update design, the target setup time is updated periodically in each update interval of a fixed duration based on the paging performance for that update interval. For example, the outer loop update interval may cover K paging occasions, where K may be any value greater than one. The decoding error rate may be determined for each update interval of K paging occasions, and the target setup time may be updated based on the decoding error rate for that update interval.

In a second outer loop update design, the target setup time is updated in a manner to account for possible interaction between the inner and outer loops. Whenever the target setup time is adjusted by the outer loop, the inner loop may converge in some number of paging occasions. The likelihood of encountering paging errors may be higher during the convergence time of the inner loop, and these paging errors should not result in an immediate counter correction by the outer loop. To avoid this interaction between the inner and outer loops, the outer loop may maintain the target setup time for an initial period of N paging occasions following an adjustment to the target setup time. This initial period may also be referred to as a minimum fill period, an immunity period, etc. In one design, the target setup time is increased during the initial period only if the decoding error rate exceeds a high threshold Th3 that is higher than Th2. For example, Th3 may be equal to 5%, and Th2 may be equal to 1%. In this case, the target setup time may be increased during the initial period only if the decoding error rate exceeds 5%. The paging errors during the initial period may be due to transient in the inner loop. These paging errors may be cleared at the end of the initial period.

Figure 6:
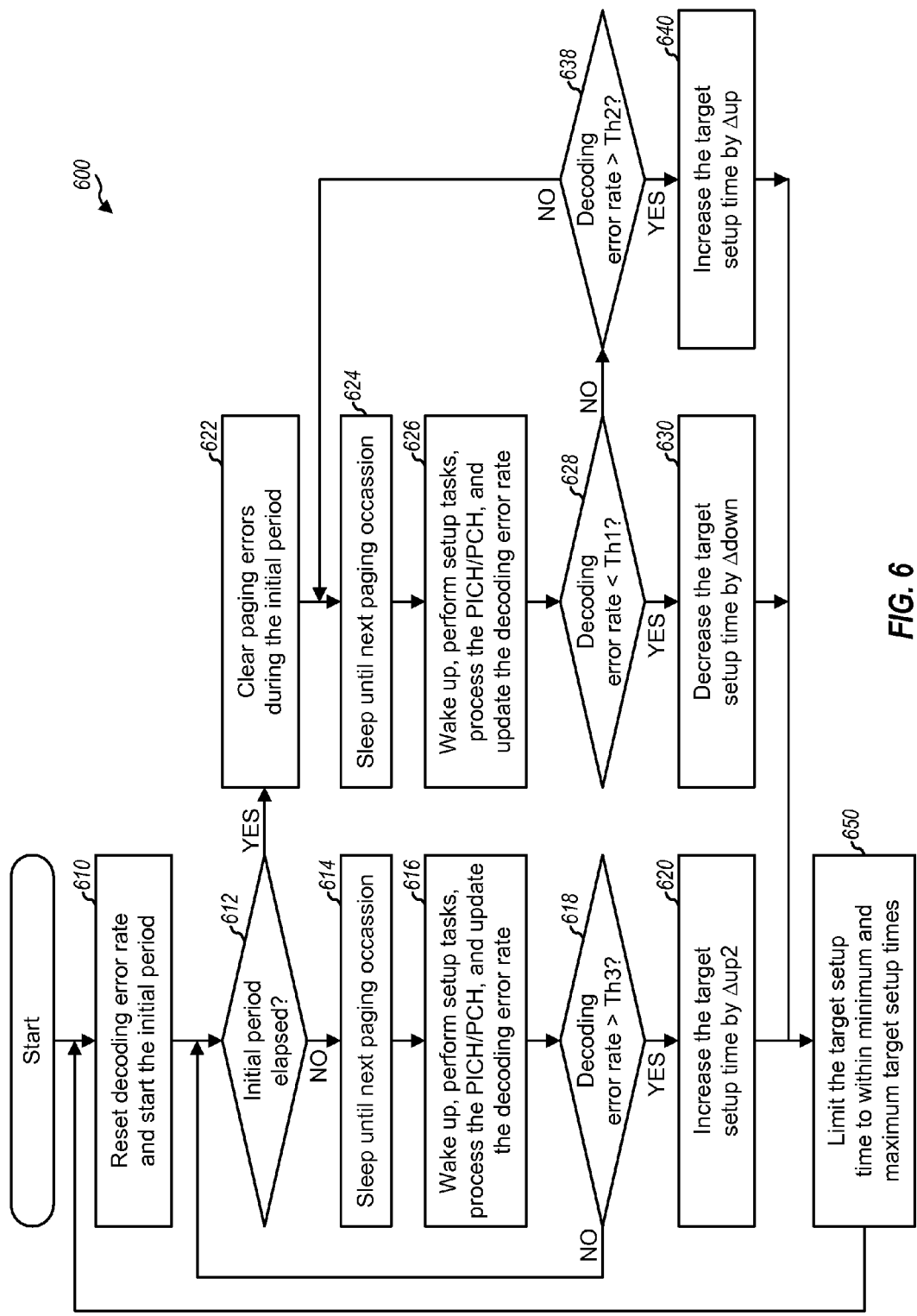
FIG. 6 shows a process for adjusting the target setup time.

FIG. 6 shows a process 600 for adjusting the target setup time based on the second outer loop update design. The decoding error rate may be reset to zero, and the initial period may be started (block 610). If the initial period has not elapsed, as determined in block 612, then the UE may sleep until the next paging occasion (block 614). The UE may wake up prior to the next paging occasion, perform setup tasks, process the PICH/PCH, and update the decoding error rate (block 616). If the decoding error rate is not greater than the Th3 threshold, as determined in block 618, then the UE may return to block 612. Otherwise, if the decoding error rate is greater than the Th3 threshold, then the UE may increase the target setup time by Δup2 (block 620). Δup2 may or may not be equal to Δup.

If the initial period has elapsed, as determined in block 612, then the UE may clear the paging errors during the initial period (block 622) and may then sleep until the next paging occasion (block 624). The UE may wake up prior to the next paging occasion, perform setup tasks, process the PICH/PCH, and update the decoding error rate (block 626). If the decoding error rate is less than the Th1 threshold, as determined in block 628, then the UE may decrease the target setup time by Δdown (block 630). Otherwise, if the decoding error rate is greater than the Th2 threshold, as determined in block 638, then the UE may increase the target setup time by Δup (block 640). If the decoding error rate is between the Th1 and Th2 thresholds, then the UE may return to block 624.

After an adjustment to the target setup time in block 620, 630, or 640, the target setup time may be constrained to be within the minimum and maximum target setup times, as shown in equation (5) (block 650). The UE may then return to block 610. The UE may also attempt to re-establish timing and/or may perform other actions if the desired paging performance cannot be achieved after the maximum target setup time has been reached.

In the design shown in FIG. 6, the target setup time is increased during the initial period only if the decoding error rate exceeds the Th3 threshold and is not adjusted otherwise. After the initial period, the target setup time is decreased if the decoding error rate is below the Th1 threshold and increased if the decoding error rate is greater than the Th2 threshold. Whenever the target setup time is adjusted, either during or after the initial period, the decoding error rate is reset and the initial period is restarted.

For the design shown in FIG. 6, the target setup time may be adjusted in any paging occasion. During the initial period, the target setup time may be increased in any paging occasion in which the decoding error rate exceeds the Th3 threshold. After the initial period, the target setup time may be adjusted in any paging occasion in which the decoding error rate falls below the Th1 threshold or exceeds the Th2 threshold. In steady state, the outer loop may run for any number of paging occasions without updating the target setup time as long as the decoding error rate is between the Th1 and Th2 thresholds.

In one design, the target setup time may be increased by the same amount in blocks 620 and 640, so that Δup2=Δup. In another design, the target setup time may be increased by a larger up step in block 620 than in block 640, so that Δup2>Δup. For example, the target setup time may be increased by Δup2=5 ticks in block 620 and by Δup=3 ticks in block 640. Other up step sizes may also be used for blocks 620 and 640.

In one design, the decoding error rate is determined for a sliding window covering M paging occasions, where M may be any suitable value. In one design, M is equal to 1024, and the decoding error rate is determined for up to 1024 most recent paging occasions. A circular buffer may be used to store the processing results and may include M bits for up to M most recent paging occasions. The bit for each paging occasion may be set to '0' if the paging indicator is correctly detected and may be set to '1' if there is a paging error, e.g., due to a PI_Sum error or a PO_Late error. The buffer may be initialized to all zeros after the initial period has elapsed. An error counter may be used to keep track of the number of errors in the buffer and may be reset to zero when the buffer is initialized. A pointer may be used to point to the buffer location for the current paging occasion and may be initialized to any buffer location.

Thereafter, in each paging occasion, the error counter may be decremented by one if the current buffer location contains a '1'. The current buffer location may then be filled with either '0' or '1' depending on the processing result for the current paging occasion. The error counter may then be incremented by one if the current buffer location is filled with '1'. Once the buffer is completely filled, the content of the error counter may be used for the decoding error rate. For example, if M=1024, Th1=0.75%, and Th2=1.0%, then once the buffer is completely filled, the target setup time may be increased if the error counter is 11 or more (which means that the decoding error rate exceeds 1%) or decreased if the error counter is 6 or less (which means that the decoding error rate is below 0.75%). If the buffer is not completely filled, then the decoding error rate may be determined based on the error counter and the number of buffer locations that is filled. For example, if only 500 buffer locations are filled and five errors are present, then the decoding error rate is 1%.

In one design, a smaller buffer may be used to store the processing results for the N paging occasions in the initial period after an adjustment to the target setup time. In another design, a single buffer may be used to store the processing results for the initial period as well as subsequent period.

Figure 7:
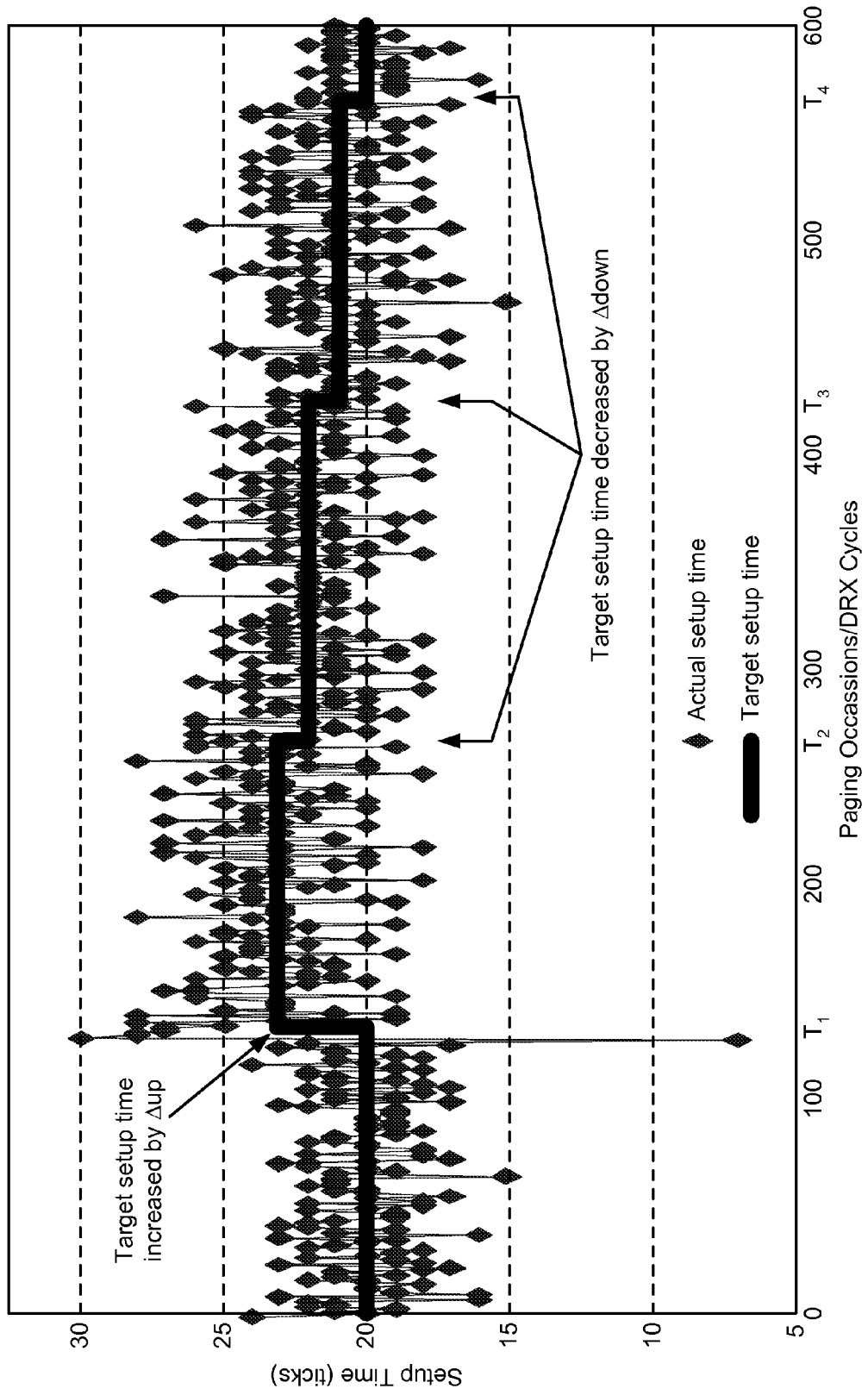
FIG. 7 shows operation of the inner and outer loops.

FIG. 7 shows operation of the inner and outer loops in accordance with the second outer loop update design. The outer loop may adjust the target setup time to achieve the desired paging performance. The inner loop may determine the selected setup time such that the actual setup time matches the target setup time. The actual setup time may fluctuate about the target setup time due to various factors, as described above. When the decoding error rate exceeds the Th2 threshold at time T1, the target setup time is increased by a larger up step size to improve paging performance. The target setup time is decreased by a smaller down step size at each of times $T_2$, $T_3$ and $T_4$ when the decoding error rate falls below the Th1 threshold. In the example shown in FIG. 7, the initial period covers N=100 paging occasions, and the target setup time is decreased after at least 100 paging occasions have passed.

In the design shown in equation (3), the decoding error rate is determined without distinguishing the different types of paging errors. In another design, different decoding error rates may be determined for different types of error. For example, a first decoding error rate may be determined for PI_Sum errors, and a second decoding error rate may be determined for PO_Late errors. The target setup time may then be adjusted based on the two decoding error rates. In one design, different step sizes may be used for different types of paging error. For example, a larger up step size may be used for PO_Late errors, and a smaller up step size may be used for PI_Sum errors. In another design, different Th1 and/or Th2 thresholds may be used for different types of paging error.

In general, the target setup time may be adjusted in various manners based on different decoding error rates, different step sizes, different decoding error rate thresholds, etc. In one design, a larger up step size may be used for PO_Late errors if the number of PO_Late errors is equal to or greater than the number of PI_Sum errors. A smaller up step size may be used for PO_Late errors if the number of PO_Late errors is less than the number of PI_Sum errors. In general, paging performance may be determined for any type of paging errors, and the target setup time may be adjusted based on any algorithm and any set of parameters for each paging error type.

In the designs described above, the target setup time is adjusted in response to paging errors that have occurred. In another design, the history of prior paging errors may be used to predict the likelihood of a paging error in a future (e.g., the next) paging occasion. The prediction may be based on N-gram analysis, Markov models, or some other prediction techniques. The target setup time may then be adjusted based on the predicted likelihood of paging error. For example, the target setup time may be increased if the likelihood of paging error is greater than a threshold. The target setup time may thus be adjusted to avoid predicted paging errors. If a predicted paging error turns out to be false, then the prediction algorithm may be updated to discourage this type of prediction.

The techniques described herein may be used to provide automatic calibration of the DRX timeline for the UE in real-time during normal operation. The outer loop may adjust the target setup time relatively slowly in order to achieve the desired paging performance while reducing power consumption when possible. The techniques may be used to receive paging information in UMTS, as described above. The techniques may also be used to receive paging information in other wireless communication systems such as GSM and cdma2000 systems. The techniques may also be used to receive other transmissions transmitted in bursts at known time intervals. For example, the techniques may be used to periodically receive traffic data in a Voice-over-Internet-Protocol (VoIP) call or a multi-media call, to receive broadcast information for a broadcast service, etc.

Figure 8:
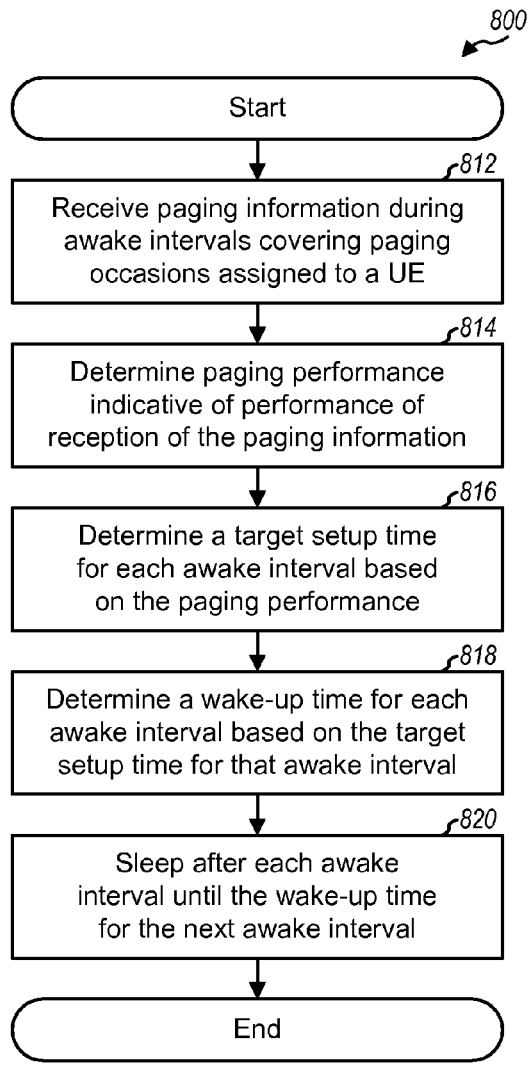
FIG. 8 shows a process for determining the target setup time for paging.

FIG. 8 shows a design of a process 800 for determining target setup time for paging. Paging information may be received during awake intervals, which may cover paging occasions assigned to a UE (block 812). Paging performance indicative of performance of reception of the paging information may be determined (block 814). The paging information may comprise paging indicators, and a paging indicator may be received in each awake interval. The paging performance may be determined based on a decoding error rate of the paging indicators for the UE.

A target setup time for each awake interval may be determined based on the paging performance (block 816). In one design, the target setup time may be (i) decreased if the paging performance is better than a first threshold or (ii) increased if the paging performance is worse than a second threshold. The target setup time may be decreased by a down step size and increased by an up step size, which may be equal to or larger than the down step size. The target setup time may also be limited to within a maximum value and a minimum value, e.g., as shown in equation (5).

In one design, the target setup time may be updated in each update period of a predetermined number of awake intervals. In another design, e.g., as shown in FIG. 6, the paging performance may be determined for a period of at least N awake intervals after a prior adjustment of the target setup time, where N is greater than one. The target setup time may then be adjusted if the paging performance is better than the first threshold or worse than the second threshold. The target setup time may be increased within an initial period of N awake intervals after the prior adjustment only if the paging performance is worse than a third threshold, which may be worse than the second threshold. The paging performance may be determined for the period of at least N awake intervals with the paging errors within the initial period cleared.

A wake-up time may be determined for each awake interval based on the target setup time for that awake interval (block 818). The UE may sleep after each awake interval until the wake-up time for the next awake interval (block 820).

Figure 9:
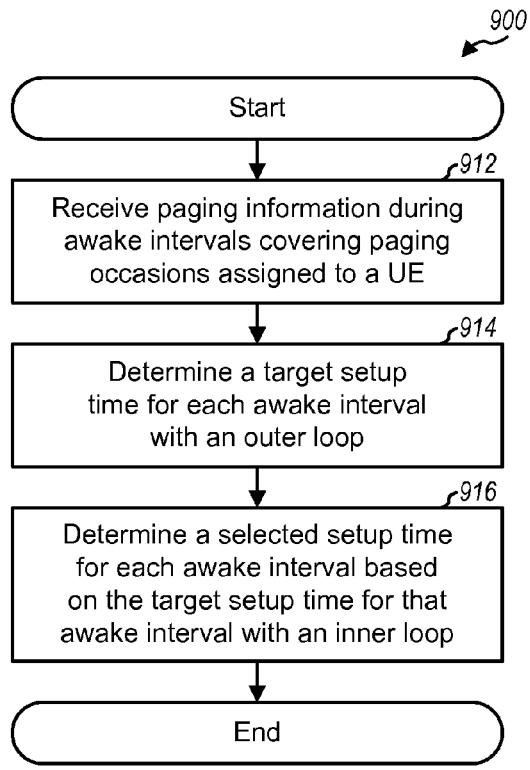
FIG. 9 shows a process for determining the target setup time based on the inner and outer loops.

FIG. 9 shows a design of a process 900 for determining target setup time for paging based on inner and outer loops. Paging information may be received during awake intervals, which may cover paging occasions assigned to a UE (block 912). A target setup time for each awake interval may be determined with an outer loop (block 914). For block 914, paging performance indicative of performance of reception of the paging information may be determined. The target setup time for each awake interval may then be determined based on the paging performance. A selected setup time for each awake interval may be determined based on the target setup time for that awake interval with an inner loop (block 916). For block 916, an actual setup time for a current awake interval may be determined. The selected setup time for a next awake interval may then be determined based on the actual setup time for the current awake interval and the target setup time for the next awake interval, e.g., as shown in equation (1) or (2). The selected setup time may be updated at a first rate (e.g., each awake interval) by the inner loop. The target setup time may be updated at a second rate by the outer loop. The second rate may be slower than the first rate.

Figure 10:
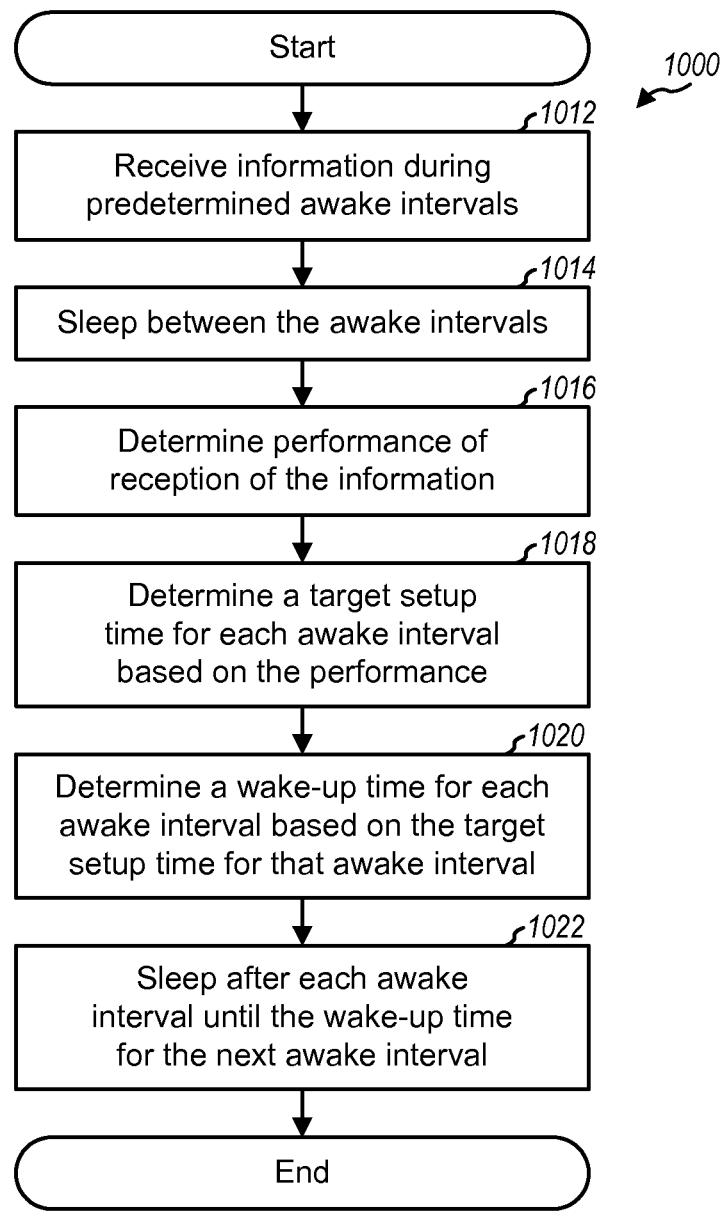
FIG. 10 shows a process for determining the target setup time for a non-continuous transmission.

FIG. 10 shows a design of a process 1000 for determining target setup time for a non-continuous transmission. Information may be received during predetermined awake intervals, which may or may not be periodic but occur at known times (block 1012). The UE may sleep between the awake intervals (block 1014). Performance of reception of the information may be determined (block 1016). The information may be for a VoIP call, a multi-media call, a broadcast service, paging, etc. The information may comprise data packets, and the performance may be determined based on a packet error rate for the data packets. The information may also comprise indicators and/or other types of information, and the performance may be quantified by an error rate and/or other metrics. In any case, a target setup time for each awake interval may be determined based on the performance (block 1018). A wake-up time may be determined for each awake interval based on the target setup time for that awake interval (block 1020). The UE may sleep after each awake interval until the wake-up time for the next awake interval (block 1022).

The techniques described herein may be implemented in hardware and/or software/firmware. If implemented in software/firmware, the same implementation may be used across different hardware combinations, and timing may be adjusted independently for each hardware combination. If implemented in hardware, the hardware may monitor itself and self-adjust. In any case, the techniques described herein may help account for hardware/software differences across different models of UE, embedded mobile devices, etc.

Figure 11:
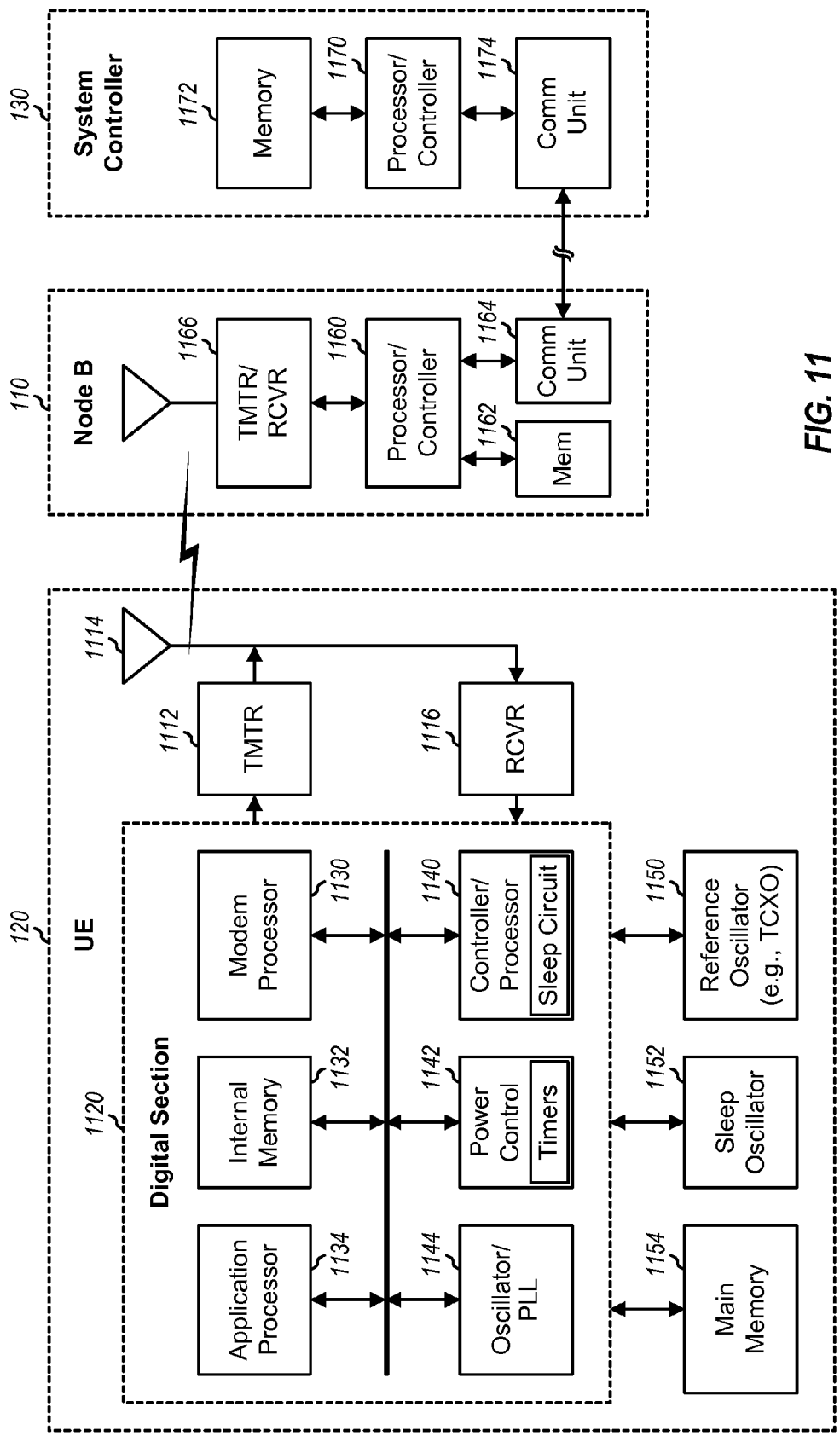
FIG. 11 shows a block diagram of the UE, a Node B, and a system controller.

FIG. 11 shows a block design of a design of a UE 120, which may be one of the UEs in FIG. 1. On the transmit path, a digital section 1120 may process data to be transmitted by UE 120 and provide output chips to a transmitter (TMTR) 1112. Transmitter 1112 may condition (e.g., convert to analog, filter, amplify, and frequency upconvert) the output chips and generate an uplink signal, which may be transmitted via an antenna 1114. On the receive path, antenna 1114 may receive signals transmitted by Node Bs and provide a received signal to a receiver (RCVR) 1116. Receiver 1116 may condition (e.g., filter, amplify, frequency downconvert, and digitize) the received signal and provide samples to digital section 1120.

Digital section 1120 may include various processing units that support communication with one or more systems. In the design shown in FIG. 11, digital section 1120 includes a modem processor 1130, an internal memory 1132, an application processor 1134, a controller/processor 1140, a power control unit 1142, and an oscillator/phase locked loop (PLL) 1144. Modem processor 1130 may perform encoding, modulation, decoding, demodulation, etc. Internal memory 1132 may store data and program code for the processing units within digital section 1120. Application processor 1134 may perform processing for various applications such as, e.g., VoIP and multi-media calls.

Controller/processor 1140 may control the operation of various units within digital section 1120. Controller/processor 1140 may include a sleep circuit that may implement the inner and outer loops and may determine the target setup time and the wake-up time for each awake interval, as described above. Controller/processor 1140 may implement process 800 in FIG. 8, process 900 in FIG. 9, process 1000 in FIG. 10, and/or other processes for the techniques described herein. Power control unit 1142 may control power to various units within digital section 1120. Power control unit 1142 may include timers that indicate when to sleep, when to wake up, when to remove power during sleep, and when to apply power during setup and processing times. Oscillator/PLL 1144 may generate clocks for the processing units within digital section 1120.

In the design shown in FIG. 11, digital section 1120 further couples to a reference oscillator (e.g., a TCXO) 1150, a sleep oscillator 1152, and a main memory 1154. Reference oscillator 1150 may provide an accurate clock used by other oscillators as the reference frequency. Sleep oscillator 1152 may provide a low-frequency sleep clock used by digital circuitry powered on during sleep. Memory 1154 may provide bulk storage for data and program code used by digital section 1120.

FIG. 11 also shows a design of Node B 110, which is one of the Node Bs in FIG. 1, and system controller 130. Node B 110 includes a processor/controller 1160, a memory (Mem) 1162, a communication (Comm) unit 1164, and a transmitter/receiver 1166. Transmitter/receiver 1166 may support radio communication with UE 120 and other UEs. Processor/controller 1160 may perform various functions for communication with and paging of the UEs. Memory 1162 may store program codes and data for Node B 110. Communication unit 1164 may facilitate communication with system controller 130.

System controller 130 includes a processor/controller 1170, a memory 1172, and a communication unit 1174. Processor/controller 1170 may perform various functions to support communication and paging for the UEs, e.g., determine which cells are in the paging area of UE 120 and send paging indicators and paging messages to these cells. Memory 1172 may store program codes and data for system controller 130. Communication unit 1174 may facilitate communication with Node B 110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   at least one processor configured to receive paging information during awake intervals, to determine paging performance indicative of performance of reception of the paging information, to determine a target setup time for each awake interval based on the paging performance including an inner loop that determines a selected setup time for each paging occasion and an outer loop that determines a target setup time for each paging occasion, wherein determining the selected setup time for each paging occasion is based on an actual setup time for a paging occasion and a target setup time for a paging occasion, wherein determining the target setup time comprises to decrease the target setup time if the paging performance is better than a first threshold, and to increase the target setup time if the paging performance is worse than a second threshold; and
   a memory coupled to the at least one processor.

2. The apparatus of claim 1, wherein the at least one processor is configured to receive a paging indicator in each awake interval, and to determine the paging performance based on a decoding error rate of paging indicators.

3. The apparatus of claim 1, wherein the at least one processor is configured to update the target setup time in each update period of a predetermined number of awake intervals.

4. The apparatus of claim 1, wherein the at least one processor is configured to determine paging performance for a period of at least N awake intervals after a prior adjustment of the target setup time, where N is greater than one, and to adjust the target setup time if the paging performance is better than the first threshold or is worse than the second threshold.

5. The apparatus of claim 4, wherein the memory is configured to store paging errors for M most recent awake intervals, where M is greater than N, and wherein the period of at least N awake intervals is among the M most recent awake intervals.

6. The apparatus of claim 4, wherein the at least one processor is configured to increase the target setup time during an initial period of N awake intervals after the prior adjustment only if the paging performance is worse than a third threshold, the third threshold being worse than the second threshold.

7. The apparatus of claim 4, wherein the at least one processor is configured to clear paging errors within an initial period of N awake intervals after the prior adjustment, and to determine the paging performance for the period of at least N awake intervals with the paging errors during the initial period cleared.

8. The apparatus of claim 1, wherein the at least one processor is configured to decrease the target setup time by a down step size if the paging performance is better than the first threshold, and to increase the target setup time by an up step size if the paging performance is worse than the second threshold, the up step size being larger than the down step size.

9. The apparatus of claim 1, wherein the at least one processor is configured to limit the target setup time to within a maximum value and a minimum value.

10. The apparatus of claim 1, wherein the at least one processor is configured to predict paging performance for a future awake interval based on paging performance for past awake intervals, and to determine the target setup time for the future awake interval based on the predicted paging performance.

11. The apparatus of claim 1, wherein the at least one processor is configured to determine a wake-up time for each awake interval based on the target setup time for the awake interval, and to sleep after each awake interval until a wake-up time for a next awake interval.

12. A method for wireless communication, comprising:
receiving paging information during awake intervals;
determining paging performance indicative of performance of reception of the paging information;
determining a target setup time for each awake interval based on the paging performance, wherein determining the target setup time comprises:
decreasing the target setup time if the paging performance is better than a first threshold, and
increasing the target setup time if the paging performance is worse than a second threshold; and
including an inner loop that determines a selected setup time for each paging occasion and an outer loop that determines a target setup time for each paging occasion, wherein determining the selected setup time for each paging occasion is based on an actual setup time for a paging occasion and a target setup time for a paging occasion.

13. The method of claim 12, wherein the receiving the paging information comprises receiving a paging indicator in each awake interval, and wherein the determining the paging performance comprises determining the paging performance based on a decoding error rate of paging indicators.

14. The method of claim 12, wherein the determining the target setup time further comprises
determining paging performance for a period of at least N awake intervals after a prior adjustment of the target setup time, where N is greater than one, and
adjusting the target setup time if the paging performance is better than the first threshold or is worse than the second threshold.

15. The method of claim 14, wherein the period of at least N awake intervals is among M most recent awake intervals, M is greater than N.

16. The method of claim 14, wherein the determining the target setup time further comprises increasing the target setup time during an initial period of N awake intervals after the prior adjustment only if the paging performance is worse than a third threshold, the third threshold being worse than the second threshold.

17. An apparatus for wireless communication, comprising:
means for receiving paging information during awake intervals;
means for determining paging performance indicative of performance of reception of the paging information; and
means for determining a target setup time for each awake interval based on the paging performance including an inner loop that determines a selected setup time for each paging occasion and an outer loop that determines a target setup time for each paging occasion, wherein determining the selected setup time for each paging occasion is based on an actual setup time for a paging occasion and a target setup time for a paging occasion, and wherein the means for determining the target setup time comprises:
means for decreasing the target setup time if the paging performance is better than a first threshold, and
means for increasing the target setup time if the paging performance is worse than a second threshold.

18. The apparatus of claim 17, wherein the means for receiving the paging information comprises means for receiving a paging indicator in each awake interval, and wherein the means for determining the paging performance comprises means for determining the paging performance based on a decoding error rate of paging indicators.

19. The apparatus of claim 17, wherein the means for determining the target setup time further comprises
means for determining paging performance for a period of at least N awake intervals after a prior adjustment of the target setup time, where N is greater than one, and
means for adjusting the target setup time if the paging performance is better than the first threshold or is worse than the second threshold.

20. The apparatus of claim 19, wherein the period of at least N awake intervals is among M most recent awake intervals, M is greater than N.

21. The apparatus of claim 19, wherein the means for determining the target setup time further comprises means for increasing the target setup time during an initial period of N awake intervals after the prior adjustment only if the paging performance is worse than a third threshold, the third threshold being worse than the second threshold.

22. A non-transitory computer-readable medium, comprising:
a computer program product comprising instructions causing a processor to execute code, including code for:
causing at least one computer to receive paging information during awake intervals;
causing the at least one computer to determine paging performance indicative of performance of reception of the paging information; and
causing the at least one computer to determine a target setup time for each awake interval based on the paging performance including an inner loop that determines a selected setup time for each paging occasion and an outer loop that determines a target setup time for each paging occasion, wherein determining the selected setup time for each paging occasion is based on an actual setup time for a paging occasion and a target setup time for a paging occasion, and wherein determining the target setup time comprises:
decreasing the target setup time if the paging performance is better than a first threshold, and
increasing the target setup time if the paging performance is worse than a second threshold.

23. An apparatus for wireless communication, comprising:
at least one processor configured to receive information during predetermined awake intervals, to sleep between the awake intervals, to determine performance of reception of the information, and to determine a target setup time for each awake interval based on the performance including an inner loop that determines a selected setup time for each paging occasion and an outer loop that determines a target setup time for each paging occasion, wherein determining the selected setup time for each paging occasion is based on an actual setup time for a paging occasion and a target setup time for a paging occasion, and wherein determining the target setup time comprises decreasing the target setup time if the paging performance is better than a first threshold, and increasing the target setup time if the paging performance is worse than a second threshold; and a memory coupled to the at least one processor.

24. The apparatus of claim 23, wherein the information comprises data packets, and wherein the at least one processor is configured to determine the performance based on a packet error rate for the data packets.

25. The apparatus of claim 23, wherein the at least one processor is configured to receive the information for a Voice-over-Internet Protocol (VoIP) call, a multi-media call, a broadcast service, or paging.

* * * * *